United States Patent [19]

Herold et al.

[11] Patent Number: 4,551,517

[45] Date of Patent: Nov. 5, 1985

[54] TWO-COMPONENT POLYURETHANE ADHESIVE

[75] Inventors: Julius Herold, Hilden; Hermann Kluth, Duesseldorf; Alfred Meffert, Monheim; Manfred Leder, Hilden, all of Fed. Rep. of Germany

[73] Assignee: Henkel KGaA, Duesseldorf, Fed. Rep. of Germany

[21] Appl. No.: 680,862

[22] Filed: Dec. 12, 1984

[30] Foreign Application Priority Data

Dec. 24, 1983 [DE] Fed. Rep. of Germany ....... 3347045

[51] Int. Cl.$^4$ .............................................. C08G 18/48
[52] U.S. Cl. ..................................... 528/60; 156/327; 156/330; 156/331.4; 427/385.5; 427/386; 528/66; 528/73; 528/74.5; 528/75; 528/76; 528/77; 528/78; 528/79
[58] Field of Search ..................... 528/60, 66, 73, 74.5, 528/75, 76, 77, 78, 79; 156/327, 330, 331.4; 427/385.5, 386

[56] References Cited

U.S. PATENT DOCUMENTS 3,699,061 10/1972 Cunningham ..................... 528/74.5
4,025,477 5/1977 Borden et al. ..................... 528/74.5

FOREIGN PATENT DOCUMENTS 3246611 6/1984 Fed. Rep. of Germany .
3246612 6/1984 Fed. Rep. of Germany .

OTHER PUBLICATIONS

J. American Chem. Soc. 66, 1925, (1944), D. Swern.

Primary Examiner—Maurice J. Welsh
Attorney, Agent, or Firm—Ernest G. Szoke; Nelson Littell, Jr.; Henry E. Millson, Jr.

[57] ABSTRACT

The invention relates to two-component polyurethane adhesive preparations in which the resin component is an oleochemical polyol. The oleochemical polyols used are ring-opened products of the reaction of epoxidized fatty alcohols, fatty acid esters (particularly triglycerides) or fatty acid amides with alcohols. The oleochemical polyols may be varied within wide limits in regard to their OH-functionality and so formulated with the hardener polyisocyanate components that the adhesives satisfy the relevant requirements. Reaction products of epoxidized triglycerides with monohydric alcohols are a particularly effective substitute for castor oil.

17 Claims, No Drawings

TWO-COMPONENT POLYURETHANE ADHESIVE

BACKGROUND OF THE INVENTION

This invention relates to a two-component polyurethane adhesive containing as resin a polyol produced largely from renewable, natural raw materials.

Polyurethane adhesives have been known for years and are widely used. Of particular importance in this respect, particularly for technical applications, are the two-component adhesives which are stirred and mixed together by the user before bonding to form a reaction mixture which subsequently hardens after application to the substrates to be bonded. Two-component polyurethane adhesives such as these consist of an isocyanate component having a functionality of 2 and higher, as a hardener, and of a resin, more especially a polyol. Numerous polyhydric alcohols have already been proposed as resins for two-component polyurethane adhesives, including castor oil as a natural, renewable product. Castor oil is a fatty acid triglyceride which on average contains 2.7 secondary OH-groups per molecule, the fatty acid being predominately ricinoleic acid.

Although castor oil has recently acquired some significance as a resin for two-component polyurethane adhesives and is used in particular for flexible solid adhesives, it does have the disadvantage that adhesives produced therefrom frequently show an excessively short pot life. Another disadvantage lies in the dependence upon only a single raw material. This is both an economic disadvantage and, more particularly, a technical disadvantage, i.e., castor oil is not variable in regard to the number of OH-groups present or can only be processed by elaborate reactions to form products having relatively high OH numbers for example.

OBJECTS OF THE INVENTION

The invention seeks to remedy this situation. Accordingly, one of the objects of the present invention is to provide resins for two-component polyurethane adhesives which are at least predominantly based on renewable raw materials and which guarantee a longer pot life of the adhesives.

Another object of the present invention is to provide a plurality of oleochemical polyols as resins for polyurethane adhesives. More particularly, the invention seeks to provide resins which are readily available, easy to produce and readily variable in their properties, for example, in their hydroxyl number.

A further object of the present invention is to provide a two-component polyurethane adhesive preparation consisting of (A) an isocyanate compound having a functionality of from 2 to 10, as hardener, and (B) a substantially anhydrous polyol, as resin, Components (A) and (B) being separately storable prior to their combination and at least one of said components being adapted to contain adhesive auxiliaries selected from the group consisting of solvents, accelerators, fillers, plasticizers, flameproofing agents, retarders, dyes, anti-agers and mixtures thereof, wherein said resin component is a liquid mixture of anhydrous polyols, said polyols having more than 10 carbon atoms and more than 1 hydroxyl group per molecule obtained by the reaction of an epoxy compound selected from the group consisting of epoxidized higher fatty alcohols, epoxidized higher fatty acid esters, epoxidized higher fatty acid amides, with an alcohol having a functionality of from 1 to 10, said reaction opening the epoxide ring with formation of a secondary hydroxyl group and an adjacent ether group, and optionally further reaction with $C_2-C_4$-alkylene oxides.

These and other objects of the present invention will become more apparent as the description thereof proceeds.

DESCRIPTION OF THE INVENTION

Accordingly, the present invention relates to two-component polyurethane adhesive preparations consisting of (A) an isocyanate compound having a functionality of from 2 to 10, as a hardener, and (B) a substantially anhydrous polyol, as a resin, (A) and (B) being separately storable pending use and at least one of the components being adapted to contain solvents, accelerators, fillers or auxiliaries, characterized in that the resin is a mixture of anhydrous polyols containing more than 10 carbon atoms and 2 or more hydroxyl groups which has been obtained by reacting epoxidized higher fatty alcohols
epoxidized higher fatty acid esters or
epoxidized higher fatty acid amides
with aliphatic or aromatic alcohols having a functionality of from 1 to 10 and/or with difunctional or trifunctional phenols with opening of the epoxide ring and, if desired, transesterification of the fatty acid esters and/or subsequent reaction with $C_2-C_4$-epoxides.

More particularly, the present invention relates to a two-component polyurethane adhesive preparation consisting of (A) an isocyanate compound having a functionality of from 2 to 10, as hardener, and (B) a substantially anhydrous polyol, as resin, Components (A) and (B) being separately storable prior to their combination and at least one of said components being adapted to contain adhesive auxiliaries selected from the group consisting of solvents, accelerators, fillers, plasticizers, flameproofing agents, retarders, dyes, anti-agers and mixtures thereof, wherein said resin component is a liquid mixture of anhydrous polyols, said polyols having more than 10 carbon atoms and more than 1 hydroxyl group per molecule obtained by the reaction of an epoxy compound selected from the group consisting of epoxidized higher fatty alcohols, epoxidized higher fatty acid esters, epoxidized higher fatty acid amides, with an alcohol having a functionality of from 1 to 10, said reaction opening the epoxide ring with formation of a secondary hydroxyl group and an adjacent ether group, and optionally further reaction with $C_2-C_4$-alkylene oxides.

In a first embodiment, the invention relates to polyurethane adhesive preparations of which the resins are a mixture of polyols containing more than 10 carbon atoms and 2 or more hydroxyl groups which has been obtained by reacting epoxidized higher fatty alcohols with aliphatic or aromatic alcohols having a functionality of from 2 to 10 with opening of the epoxide ring. The production of alcohol mixtures such as these does not form any part of the present invention and is described in German Patent Application No. P 32 46 611.0. Polyol mixtures suitable as resins are produced first and foremost from higher fatty alcohols predominantly containing unsaturated compounds, such as, for example, palmitoleyl alcohol, oleyl alcohol, elaidyl alcohol, linoleyl alcohol, linolenyl alcohol, gadoleyl alcohol, arachidonic alcohol, erucic alcohol or brassidyl alcohol The fatty alcohols are epoxidized by known methods, for example, by the method of D. Swern, et al., J. Am. Chem. Soc. 66, 1925 (1944). Particularly suitable starting materials for the epoxidation reaction are, for example, tallow fatty alcohol having an iodine number of from 50 to 55, distilled tallow fatty alcohol having an iodine number of from 80 to 85, 90% oleyl alcohol having an iodine number of from 92 to 96, soybean oil alcohol having an iodine number of from 100 to 130 or rapeseed oil alcohol having an iodine number of from 90 to 100. Epoxidation of these alcohols gives alcohols with epoxide numbers of from about 2 to about 6. The epoxidized higher fatty alcohols thus produced are then subjected to catalytic ring opening with polyfunctional hydroxy compounds in accordance with the teaching of the above-mentioned German Patent Application No. P 32 46 611.0. Where ring opening is carried out with polyhydric aliphatic alcohols, acidic catalysis is preferred. To that end, the polyfunctional hydroxy component is best introduced first and the epoxidized higher fatty alcohol subsequently added in portions at temperatures of from 50° to 130° C. Where the reaction is carried out with polyhydric aromatic compounds, basic catalysis is preferred. The reaction takes place at temperatures in the range from 100° to 180° C. and takes slightly longer, i.e., from 4 to 8 hours, by comparison with acidic catalysis.

The polyol-containing mixtures according to the invention contain molecules of different structure, depending upon the quantity of reactants used and upon the way in which they are introduced. Thus, where the epoxidized higher fatty alcohols are added to an excess of polyfunctional hydroxy compounds, the 1:1-adduct is primarily formed. The 1:1-adduct is a dialkylether (or alkylphenylether), of which one alkyl radical is derived from the epoxidized higher fatty alcohol and contains a secondary hydroxyl group in the β-position to the ether group. The other alkyl radical (or phenyl radical) is derived from the polyfunctional hydroxy compound. It contains n-1 hydroxyl groups where a polyfunctional hydroxy compound containing n-hydroxyl groups has been used.

If the 1:1-adduct formed is present in addition to unreacted polyfunctional hydroxy compound in a reaction mixture, the epoxide ring of another molecule of epoxidized fatty alcohol may, on the one hand, be opened by the reaction with the polyfunctional hydroxy compound to form another molecule of 1:1-adduct, although on the other hand a reaction may also take place with a hydroxyl group of the 1:1-adduct to form the 2:1-adduct. Two types of 2:1-adducts are possible in this reaction, namely those in which the hydroxyl group of the 1:1-adduct which is derived from the higher fatty alcohol reacts with another epoxide group and those in which the hydroxyl group of the hydroxy compound of the 1:1-adduct reacts with another epoxide group.

Suitable resins for two-component polyurethane adhesives according to the invention are the reaction products of epoxidized higher fatty alcohols with various aromatic or aliphatic alcohols. Thus, it is possible to use primary, secondary or tertiary, polyhydric alcohols containing 2, 3, 4 or up to 10 OH-groups. Other resins are the reaction products of epoxidized higher fatty alcohols with dihydroxy compounds, more particularly lower alkanediols, such as, for example, ethylene glycol, propylene glycol, isomeric butane diols, neopentyl glycol, hexane diol and the oligomers obtainable from those compounds by autocondensation, such as, for example, di-, tri- and tetraglycols. 1:1- or 2:1-adducts may be produced from epoxidized higher fatty alcohols and these di-hydroxy compounds, depending upon the nature of the reaction. Both types of product are suitable resins.

Other suitable resins are the reaction products of epoxidized higher fatty alcohols with trihydroxy compounds more particularly lower alkanetriols, such as, for example, glycerol, trimethylol ethane or trimethylol propane. Finally, the reaction products of epoxidized higher fatty alcohols with OH-compounds of relatively high functionality, more particularly lower alkanepolyols such as, for example, pentaerythritol or sorbitol, may also be used as resins. Other reaction products with hydroxy compounds of relatively high functionality are the reaction products with condensed glycerols, condensed trimethylol propane or condensed pentaerythritol. Finally, the reaction products of epoxidized higher fatty alcohols with dihydric aromatic compounds, for example with bisphenol A, are suitable resins.

Generally speaking, preferred resins based on epoxidized higher fatty alcohols are the reaction products of epoxidized higher fatty alcohols with $C_2$-$C_8$-alcohols having a functionality of from 2 to 10 and more particularly, from 2 to 4 in a ratio of from 1:1 to 1:10. In this connection, a ratio of 1:1 means that 1 mole of epoxidized higher fatty alcohol is used per mole of hydroxyl group.

Preferably, the reaction products of epoxidized higher fatty alcohols with polyfunctional alcohols, utilized as the resin component should be liquids having a viscosity of over 250 mPa.s at 23° C.

The most preferred group of resins for two-component polyurethane adhesives according to the invention are the ring-opening products of epoxidized fatty acid esters with aliphatic alcohols having a functionality of from 1 to 10. One particularly important sub-group of these compounds are the ring-opening products of epoxidized triglycerides, i.e., epoxidized higher fatty acid glycerol esters, in which ring opening has been carried out with the ester bond intact. Compounds such as these are particularly readily available and can be produced in a wide range of variation. Various epoxidized triglycerides of vegetable or animal origin may be used as starting materials for producing the ring-opening products. The only requirement is that a substantial proportion of epoxide groups should be present. For example, epoxidized triglycerides containing from 2 to 10% by weight of epoxide oxygen are suitable. Products having an epoxide oxygen content of from 3 to 5 by weight are particularly suitable for certain applications. This epoxide oxygen content may be adjusted by starting out from triglycerides having a relatively low iodine number and subjecting them to thorough epoxidation or by starting out from triglycerides having a high iodine number and only partly reacting them to form epoxides. Another group of products suitable for other applications is based on epoxidized triglycerides having an epoxide oxygen content of from 4 to 8.5%. Products such as these can be produced from the following fats and oils (in order of increasing initial iodine number), beef tallow, palm oil, lard, castor oil, peanut oil, rapeseed oil and, preferably, cottonseed oil, soybean oil, train oil, sunflower seed oil, linseed oil. Particularly preferred starting materials are epoxidized soybean oil having an epoxide number of from 5.8 to 6.5, epoxidized sunflower seed oil having an epoxide number of from 5.6 to 6.6, epoxidized linseed oil having an epoxide number of from 8.2 to 8.6 and epoxidized train oil having an epoxide number of from 6.3 to 6.7.

To produce resins suitable for use in accordance with the invention, the epoxidized triglycerides may be subjected to complete ring opening with polyhydric or monohydric alcohols or even to partial ring opening. Partial ring opening results in the formation of modified triglycerides containing on average epoxide and hydroxyl groups and also ether groups. The production of products such as these is the subject of earlier German Patent Application No. P 32 46 612.9, according to which triglycerides of a fatty acid mixture containing at least partly olefinically-unsaturated higher fatty acids are subjected to partial ring opening with monohydric or polyhydric alcohols in the presence of catalysts to produce triglyceride reaction products by terminating the reaction through destruction or removal of the catalyst and/or the alcohol reactant after a conversion of from 20 to 80 mole percent, based on epoxide groups.

The complete or partial ring-opening of the epoxidized higher fatty acid triglycerides with hydroxy compounds having a functionality of from 1 to 10 may be carried out by the process used for the epoxidized fatty alcohols. The hydroxy compounds mentioned in that respect are again suitable, as well as monohydric alcohols. Preferred resins are ring-opening products of epoxidized higher fatty acid triglycerides with $C_1$–$C_8$-alkanols, such as methanol, ethanol, propanol, isopropanol, butanol, hexanol, 2-ethyl hexanol; fatty alcohols containing from 6 to 22 carbon atoms; cyclohexanol, benzyl alcohol, $C_2$–$C_6$-alkanediols such as ethylene glycol, propylene glycol, propane diol, butane diol, hexane diol, neopentyl glycol; $C_3$–$C_6$-alkanepolyols having 3–6 OH-groups, such as trimethylol propane, glycerol, trimethylol ethane, pentaerythritol and sorbitol and also hydroxy compounds containing ether groups, such as alkoxyalkyl glycols or other oligomeric glycols and also oligomeric glycerols or trimethylol propanes. A particularly preferred starting material is the reaction product of an epoxidized soybean oil having an epoxide number of from 5.8 to 6.5 with methanol in which all the epoxide groups have been completely ring-opened. Another preferred starting material is a reaction product such as this having a residual epoxide number of the order of 3% of epoxide oxygen. The ring opening product of a soybean oil having an epoxide number of from 4.5 to 5 with methanol has also proved effective. In this case, too, it may be said that particularly suitable products are formed when the epoxidized higher fatty acid triglycerides are reacted with $C_1$–$C_8$-alcohols having a functionality of from 1 to 4 and when the reaction ratio is in the range from 1:1 to 1:10.

In another embodiment of the invention, other epoxidized higher fatty acid esters of polyhydric alcohols may be used instead of epoxidized higher fatty acid triglycerides. Thus, epoxidized higher fatty acid, trimethylol propane, ethylene glycol, propylene glycol or pentaerythritol esters may be used in the same way and converted into partly or completely ring-opened products by reaction with one of the above-mentioned polyhydric or monohydric alcohols.

Another group of resins suitable for use in accordance with the invention for two-component polyurethane adhesives are the ring-opening and transesterification products of epoxidized higher fatty acid esters of lower alkanols, i.e., epoxidized higher fatty acid methyl, ethyl, propyl or butyl esters. Preference is attributed here to the ring-opening and transesterification products with alcohols having a functionality of from 2 to 4 and particularly to the reaction products with $C_2$–$C_4$-alkanediols, such as ethylene glycol, propylene glycol, or oligomeric ethylene glycols, oligomeric propylene glycols and to the reaction products with $C_3$–$C_6$-alkanepolyols, such as glycerol, trimethylol propane and/or pentaerythritol. Products such as these may be produced by known epoxidation and ring-opening processes; transesterfication may be carried out during or after the ring-opening step by removing the lower alkanol from the reaction equilibrium. Preference is attributed to ring-opening and transesterification products in which a ratio of from 1:1 to 1:10 has been used between the epoxidized higher fatty acid ester and the alcohol used for the reaction. In analogy to the opening products of epoxidized higher fatty alcohols, 1:1- or 1:2-adducts may be produced in this case, too. Advantageous resins are the reaction products with $C_2$–$C_8$-alkanepolyols having a hydroxyl functionality of from 2 to 4.

Another embodiment of the invention relates to resins based on reaction products of $C_2$–$C_8$-alkanepolyols having a hydroxyl functionality of from 2 to 4 with the epoxides of esters of unsaturated higher fatty acids with unsaturated higher fatty alcohols. Thus, it is possible to use the ring-opening products of the epoxidation products of the esters of olefinically-unsaturated higher fatty acids with olefinically-unsaturated aliphatic alcohols, i.e., for example, the esters of fatty acid cuts rich in oleic acid with unsaturated higher fatty alcohols or even allyl alcohol. Compounds such as these contain 2 epoxide groups per molecule which may be ring-opened by the above-mentioned alcohols having a functionality of from 2 to 4, i.e., for example, ethylene glycol, propylene glycol, glycerol or trimethylol propane.

Another embodiment of the invention relates to the use as resins of ring-opening products of epoxidized higher fatty acid alkanolamides with $C_1$–$C_8$-alcohols having a functionality of from 1 to 4 and preferably of 1 or 2. Preference is attributed here to the reaction products of epoxidized higher fatty acid monoethanolamides and diethanolamides. The reaction product of epoxidized higher fatty acid amides such as these with methanol, ethanol, ethylene glycol, propylene glycol, glycerol or trimethylol propane is particularly preferred. However, it is also possible to use reaction products with the aliphatic and/or aromatic hydroxy compounds mentioned earlier on in reference to the epoxidized higher fatty alcohols. The production of these compounds may also be carried out in the same way as described in reference to the epoxidized fatty alcohols.

In addition, all the above-mentioned alcohol mixtures suitable for use as resins may be subjected to a chain-extending reaction. To this end, they are reacted with $C_2$–$C_4$-alkylene epoxides under conditions known per se. They are preferably reacted with ethylene oxide. The alcohol mixtures may be reacted with from 1 to 40 moles of ethylene oxide per mole of OH-groups. They are preferably reacted with from 5 to 20 moles and, more preferably, with from 10 to 15 moles of ethylene oxide. Apart from ethylene oxide, they may also be reacted with propylene oxide, in which case up to 40 moles, but preferably from 5 to 20 moles of propylene oxide are used per mole of OH-groups. They may also be reacted with other short-chain epoxides, for example, with glycidol. Finally, butene oxide is a suitable reactant. The reaction with ethylene oxide and/or with glycidol results in hydrophilization of the resins, which is desirable for certain applications.

Component A of the polyurethane adhesive preparations according to the invention, namely the hardener, is an isocyanate compound having a functionality of from 2 to 4. Suitable hardeners are both aromatic and also aliphatic, monocyclic and polycyclic, polyfunctional isocyanate compounds. Thus, in a first embodiment, tolylene diisocyanate or diphenylmethane diisocyanate may be used as the aromatic isocyanate compound. Technical diphenylmethane diisocyanate containing higher diisocyanates and having an isocyanate functionality of greater than 2 is particularly preferred. Another suitable aromatic diisocyanate is xylylene diisocyanate. Various aliphatic isocyanates having a functionality of 2 and higher may also be used. Examples of isocyanates such as these are isophorone diisocyanate and dicyclohexylmethane diisocyanate as cyclic aliphatic diisocyanates. Further examples are aliphatic, straight-chain diisocyanates of the type obtained by phosgenating diamines, for example, tetramethylene diisocyanate or hexamethylene diisocyanate.

In addition to the polyfunctional isocyanate compounds, it is also possible in principle to use prepolymers as component A in the two-component polyurethane adhesives according to the invention. In the context of the invention, prepolymers are understood to be the adducts of polyfunctional isocyanates with polyhydric alcohols, for example, the reaction products of one of the above-mentioned aromatic or aliphatic diisocyanates with ethylene glycol, propylene glycol, glycerol, trimethylol propane or pentaerythritol. Reaction products of diisocyanates with polyether polyols, for example, polyether polyols based on polyethylene oxide or on polypropylene oxide, may also be used as prepolymers.

The two-component polyurethane adhesive preparations according to the invention may also contain various auxiliaries which are preferably added to the polyol resin. For example, fillers may be used. Suitable fillers are inorganic compounds which are not reactive to isocyanates, such as, for example, chalk or lime powder, precipitated silicas, zeolites, bentonites, ground minerals and other inorganic fillers known to the expert on the subject. Organic fillers, particularly short staple fibers and others, may also be used. Fillers which make the adhesive solutions thixotropic are preferred.

The two-component polyurethane adhesives according to the invention may also contain accelerators. Suitable accelerators are, for example, tertiary bases, such as bis-(N,N-dimethylamino)-diethylether, dimethylaminocyclohexane, N,N-dimethylbenzylamine, N-methylmorpholine and also the reaction products of dialkyl-(β-hydroxyethyl)-amine with monoisocyanates and esterification products of dialkyl-(β-hydroxyethyl)-amine and dicarboxylic acids. Another important accelerator is 1,4-diaminobicyclo-(2.2.2)-octane. Other suitable accelerators are non-basic substances, such as metal compounds, for example, iron pentacarbonyl, nickel tetracarbonyl, iron acetyl acetonate and also tin-(II)-(2-ethylhexoate), dibutyl tin dilaurate or molybdenum glycolate.

In addition to the above-mentioned compounds, the polyurethane adhesives according to the invention may also contain other auxiliaries, such as solvents. Suitable solvents are solvents which, in turn, do not react with isocyanate groups, such as, for example, halogenated hydrocarbons, esters, ketones, aromatic hydrocarbons and others. Plasticizers, flameproofing agents, retarders, dyes and anti-agers, of the type known in corresponding adhesives, may also be incorporated.

These adhesive auxiliaries may be employed in amounts of from 1 to 75%, preferably from 10% to 75%, of the total weight of the resin component.

The two-component polyurethane adhesives according to the invention are stored in two-pack form pending their use, i.e., the resin and the isocyanate compound (hardener) are stored separately up to that time. For application, these two compounds are mixed together and the resulting mixture applied to the substrates to be bonded. So far as the mixing ratio and measures for influencing pot life are concerned, reference is made to the general specialist knowledge of the expert on adhesives, as documented, for example in "Polyurethanes, Chemistry and Technology" by Saunders and Frisch, Vol. XVI of the High Polymers Series, Interscience Publishers, New York/London, Part I (1962) and Part II (1964). To find the correct mixing ratio, the expert will generally seek to establish equivalence between isocyanate and OH-groups. To this end, it is possible in preliminary tests to determine the OH-number of the mixtures of polyols and the isocyanate number of the isocyanate compounds, from which the number of moles of reactive groups per gram may then be calculated. Particularly suitable resins according to the invention have OH-numbers of from 120 to 240 and preferably from 150 to 210. Depending on the chemical structure involved, however, compounds having a lower or higher OH-number, for example OH-numbers of from 60 to 120 or from 240 to 500, are also suitable, providing their functionality is not less than two OH-groups per molecule. Preferably, the liquid polyol resin components have viscosities of above 250 mPa.s at 23° C. and preferably in the range of from 4000 to 80,000 mPa.s at 23° C.

The two-component polyurethane adhesives according to the invention are suitable for bonding various flexible or rigid substrates. Thus, they may be used for bonding plastics, metals or even wood either as such or in various combinations. The adhesives according to the invention are particularly suitable for use in any fields where two-component polyurethane adhesives based on castor oil have hitherto been used.

The following examples are illustrative of the practice of the invention without being limitative thereto.

EXAMPLES

The following three Examples compare two-component polyurethane adhesives based on castor oil (Comparison Example 1) with those based on oleochemical polyols (Examples 2 and 3). The following oleochemical polyols were used:

Example 2: The ring-opening product of an epoxidized soybean oil with methanol. Starting value 6.1% epoxide oxygen, end value 0%, OH number 204.

Example 3: The partly ring-opened product of an epoxidized soybean oil with methanol. Starting value 6.1% epoxide oxygen, end value 2.1%, OH number 126.

Formulation for the resin component:
32.0% by weight of polyol
65.0% by weight of chalk
2.0% by weight of silica, precipitated
1.0% by weight of zeolite powder In every case, the hardener used was crude diphenylmethane diisocyanate (crude MDI) in a molar ratio (OH-groups to NCO-groups) of 1:1.

The results of the adhesive tests are shown in Table 1.

TABLE 1

|  | Comparison Example 1 | Example 2 | Example 3 |
|---|---|---|---|
| Viscosity of the resin in mPa · s at 20° C. | 30,000 | 80,000 | 50,000 |
| Pot life (mins.) | 50 | 130 | 60 |
| Shore-D-hardness | 36 | 72 | 45 |
| Tensile shear strength on aluminum (DIN 53 283) in N/mm² | 11 | 17 | 11 |

Further tests were carried out with the partially ring-opened products of epoxidized soybean oil (starting value 6.1% by weight epoxide oxygen) with methanol. The results are shown in Table 2.

TABLE 2

Properties of 2 component-polyurethane adhesives containing MDI (Desmodur 44V10, Bayer) as hardener

| | Properties of the polyols | | | | | | Shear strength wood/wood at RT in N/mm² | | |
|---|---|---|---|---|---|---|---|---|---|
| Example No | Epoxide-Oxygen (%) | CH—number | Viscosity at 23° C. mPa · s | Molar ratio of OH/NCO | Ratio by weigh of polyol:MDI | Shore-A hardness DIN 53505 | 1 d | 4 d | 7 d |
| Castor oil | — | 165 | 745 | 1:1 | 100  39.9 | 68 | 2.06 | 2.23 | 2.35 |
| 4 | 1.11 | 156 | — | 1:1 | 100  37.8 | 94 | 3.80 | 4.23 | 4.78 |
| 5 | 2.09 | 125 | 510 | 1:1 | 100  30.3 | 63 | 0.95 | 1.22 | 1.47 |
| 6 | 2.32 | 117 | 1780 | 1:1 | 100  28.3 | 80 | 0.89 | 1.20 | 1.32 |
| 7 | 0.58 | 172 | 6370 | 1:1 | 100  41.6 | 96 | 3.08 | 3.99 | 4.58 |

Adhesives based on various other oleochemical polyols as resin component were tested.

Example 8: Reaction product of a completely epoxidized oleyl alcohol (iodine number before epoxidation approximately 92) with ethylene glycol in a molar ratio of 1:3, OH number 391.7.

Example 9: Ester of tallow fatty acid and oleyl alcohol (iodine number 80 to 85), completely epoxidized and reacted with ethylene glycol in a molar ratio of 1:3, OH number 234 (ratio of the reactive groups 1:1.5).

Example 10: Completely epoxidized ester of 1 mole of tallow fatty acid and 1 mole of ethylene glycol ring-opened with an excess of ethylene glycol, OH number 320, acid number 2.0, 0.6% epoxide oxygen.

Example 11: As Example 10, but the methyl ester. OH number 211, acid number 1.0.

Example 12: Ring-opening product of a completely epoxidized oleyl alcohol (starting iodine number 92 to 96) and ethylene glycol in a molar ratio of 2:1 (ratio of the reactive groups 1:1), OH number 251, acid number 0.7.

TABLE 3

Properties of 2 component-polyurethane adhesives containing MDI (Desmodur 44V10, Bayer) as hardener

| Example No. | Viscosity at 23° C. mPa · s | Molar ratio of OH/NCO | Ratio by weight of polyol/MDI | Pot life (mins.) | Shore-A hardness | Shear strength wood/wood at RT in N/mm² | | |
|---|---|---|---|---|---|---|---|---|
| | | | | | | 1 d | 4 d | 7 d |
| 8 | 7800 | 1:1 | 100  94.9 | 13.5 | 94 | — | 6.77 | 7.76 |
| 9 | 5850 | 1:1 | 100  56.6 | 35 | 92 | — | 6.47 | 6.64 |
| 10 | 1560 | 1:1 | 100  77.4 | 8.5 | 91 | — | 7.44 | 8.03 |
| 11 | 3560 | 1:1 | 100  60.7 | 16.5 | 96 | — | 6.91 | 8.20 |
| 12 | 280 | 1:1 | 100  50.9 | 42 | 74 | — | 0.72 | 0.78 |

We claim:

1. A two-component polyurethane adhesive preparation consisting of
   (A) an isocyanate compound having a functionality of from 2 to 10, as hardener, and
   (B) A substantially anhydrous polyol, as resin, Components (A) and(B) being separately storable prior to their combination and at least one of said components being adapted to contain adhesive auxiliaries selected from the group consisting of solvents, accelerators, fillers, plasticizers flameproofing agents, retarders, dyes, anti-agers and mixtures thereof, wherein said resin component is a liquid mixture of anhydrous polyols, said polyols having more than 10 carbon atoms and more than 1 hydroxyl group per molecule obtained by the reaction of an epoxy compound selected from the group consisting of epoxidized higher fatty alcohols, epoxidized higher fatty acid esters, epoxidized higher fatty acid amides, with an alcohol having a functionality of from 1 to 10, said reaction opening the epoxide ring with formation of a secondary hydroxyl group and an adjacent ether group, and optionally further reaction with $C_2$-$C_4$-alkylene oxides.

2. The two-component polyurethane adhesive preparation of claim 1 wherein said liquid mixture of anhydrous polyols is obtained by the reaction of epoxidized higher fatty alcohols with aliphatic $C_2$-$C_8$-alcohols having a functionality of from 2 to 4 in a ratio of from 1:1 to 1:10.

3. The two-component polyurethane adhesive preparation of claim 2 wherein said $C_2$–$C_8$-alcohols are $C_2$–$C_8$-alkanepolyols having a functionality of from 2 to 4.

4. The two-component polyurethane adhesive preparation of claim 1 wherein said liquid mixture of anhydrous polyols is obtained by the reaction of epoxidized higher fatty acid esters of alkanepolyols having a functionality of from 2 to 4 with $C_1$–$C_8$-alcohols having a functionality of from 1 to 4 in a ratio of from 1:1 to 1:10, said reaction product being substantially free of transesterification products.

5. The two-component polyurethane adhesive preparation of claim 4 wherein said $C_1$–$C_8$-alcohols are selected from the group consisting of alkanols, alkanediols and alkanetriols.

6. The two-component polyurethane adhesive preparation of claim 5 wherein said alkanepolyols having a functionality of from 2 to 4 are members selected from the group consisting of glycerol, trimethylol propane, ethylene glycol, propylene glycol, and pentaerythritol.

7. The two-component polyurethane adhesive preparation of claim 1 wherein said liquid mixture of anhydrous polyols is a ring-opened and transesterified product of epoxidized higher fatty esters of $C_1$–$C_3$-alkanols by reaction with aliphatic $C_2$–$C_8$-alcohols having a functionality of from 2 to 4 in a ratio of 1:1 to 1:10.

8. The two-component polyurethane adhesive preparation of claim 7 wherein said $C_2$–$C_8$-alcohols are selected from the group consisting of alkanediols and alkanetriols.

9. The two-component polyurethane adhesive preparation of claim 1 wherein said liquid mixture of anhydrous polyols is a ring-opened product, substantially free of transesterification products, of epoxidized esters of unsaturated higher fatty acids and unsaturated aliphatic $C_3$–$C_{22}$ alcohols by reaction with aliphatic $C_2$–$C_8$-alcohols having a functionality of from 2 to 4 in a ratio of from 1:1 to 1:10.

10. The two-component polyurethane adhesive preparation of claim 1 wherein said liquid mixture of anhydrous polyols is obtained by the reaction of epoxidized higher fatty acid alkanolamides with aliphatic $C_1$–$C_8$-alcohols having a functionality of from 1 to 4 in a ratio of from 1:1 to 1:10.

11. The two-component polyurethane adhesive preparation of claim 10 wherein said alkanolamides are selected from the group consisting of epoxidized higher fatty acid diethanolamides and epoxidized higher fatty acid monoethanolamides and said aliphatic $C_1$–$C_8$ alcohols are selected from the group of $C_1$–$C_8$ alkanols and $C_1$–$C_8$-alkanediols.

12. The two-component polyurethane adhesive preparation of claim 1 wherein said liquid mixture of anhydrous polyols is further reacted with $C_2$–$C_4$-alkylene oxides.

13. The two-component polyurethane adhesive preparation of claim 12 wherein said reaction with $C_2$–$C_4$-alkylene oxides is a reaction with ethylene oxide, or propylene oxide, or a mixture thereof, in a molar ratio of from 1:5 to 1:40 based on the hydroxyl groups present in said anhydrous polyols.

14. The two-component polyurethane adhesive preparation of claim 1 wherein said isocyanate compound is an aromatic diisocyanate.

15. The two-component polyurethane adhesive preparation of claim 14 wherein said aromatic diisocyanate is selected from the group consisting of diphenylmethane diisocyanate, tolylene diisocyanate, technical diphenylmethane diisocyanate having a functionality of greater than 2, and mixtures thereof.

16. The two-component polyurethane adhesive preparation of claim 1 wherein said adhesive auxiliaries are present in an amount of from 10% to 75% by weight of said resin compound.

17. In the process of bonding rigid or flexible substrates to one another by application of two-component polyurethane adhesive to at least one surface of said substrates and affixing said substrates together, the improvement consisting essentially of employing the two-component adhesive preparation of claim 1, as said two-component polyurethane adhesive.

* * * * *